United States Patent
Tsuji

[11] 4,017,161
[45] Apr. 12, 1977

[54] COMPACT ZOOM LENS
[75] Inventor: Sadahiko Tsuji, Yokohama, Japan
[73] Assignee: Canon Kabushiki Kaisha, Tokyo, Japan
[22] Filed: Feb. 3, 1976
[21] Appl. No.: 654,905
[30] Foreign Application Priority Data
  Feb. 26, 1975  Japan .................. 50-24316
[52] U.S. Cl. .................. 350/184; 350/216
[51] Int. Cl.² .................. G02B 15/18
[58] Field of Search .................. 350/184, 186
[56] References Cited
  UNITED STATES PATENTS
  3,506,337   4/1970   Takahashi .................. 350/184
  3,584,935   6/1971   Kojima .................. 350/184
  3,840,290   10/1974  Betensky .................. 350/184
  3,885,862   5/1975   Fujioka .................. 350/186
  3,972,591   8/1976   Suwa .................. 350/184

Primary Examiner—John K. Corbin
Assistant Examiner—Conrad Clark
Attorney, Agent, or Firm—Toren, McGeady and Stanger

[57] ABSTRACT

A zoom lens comprising four lens groups, the first group for focusing control having a positive focal length, the second group as a variator having a negative focal length, and the third group as a compensator having a positive focal length. The rays emanating from the third group are substantially parallel with respect to a common axis of the lens groups including the fourth lens group which serves as an image-forming lens and which has a positive focal length. The first group has a positive lens of a negative meniscus lens and a bi-convex lens cemented together and a positive meniscus lens, the second group has a negative meniscus lens and a negative lens comprising a bi-concave lens and a positive lens cemented together, and the third group has a negative meniscus lens and a bi-convex lens. The fourth group is composed of a positive meniscus lens, a bi-concave lens, two bi-convex lenses and a negative meniscus lens.

7 Claims, 20 Drawing Figures

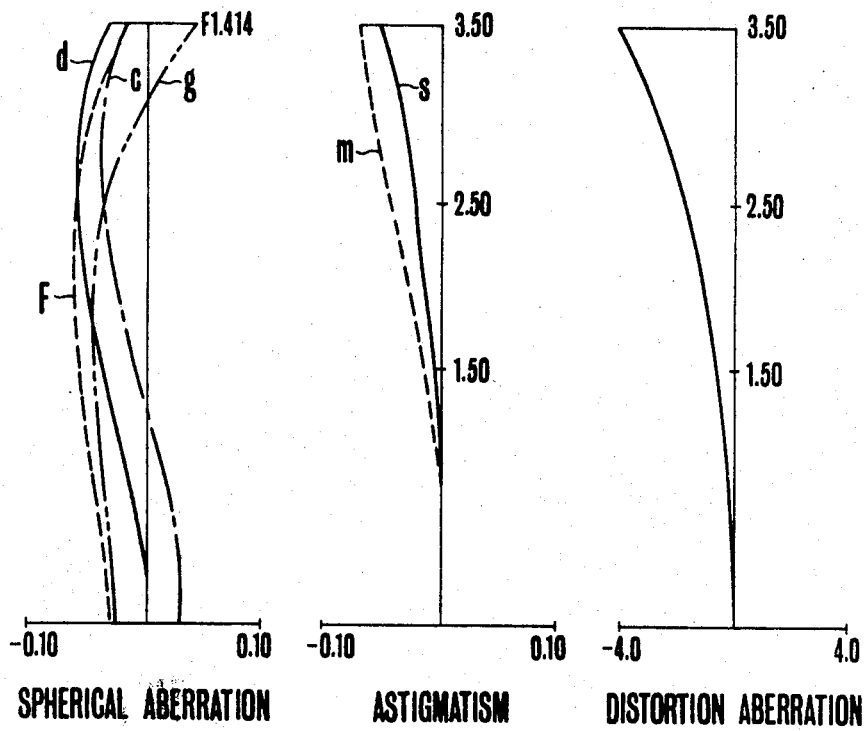

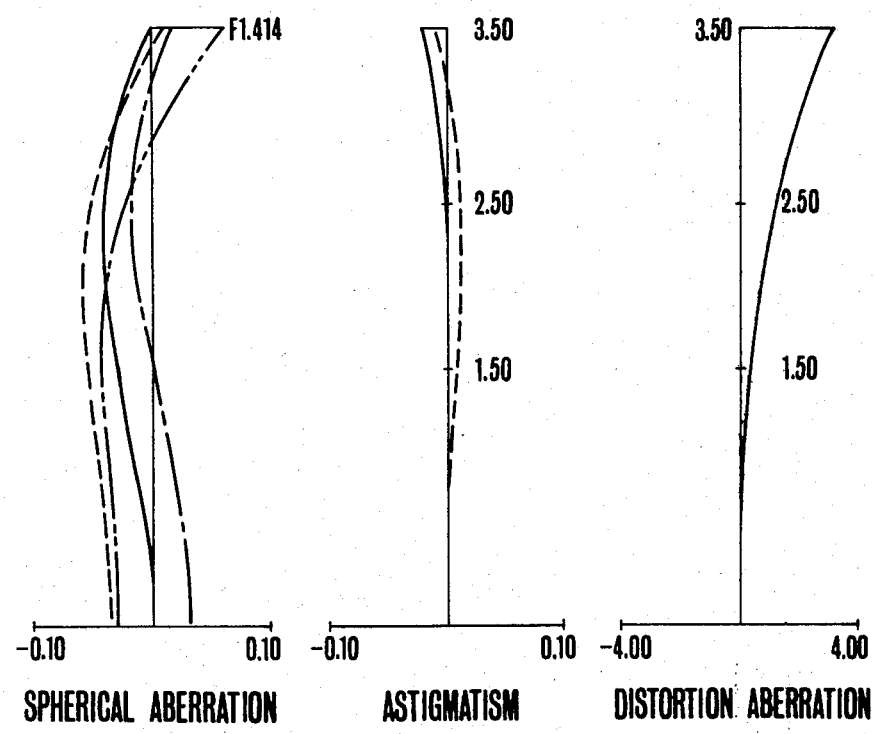

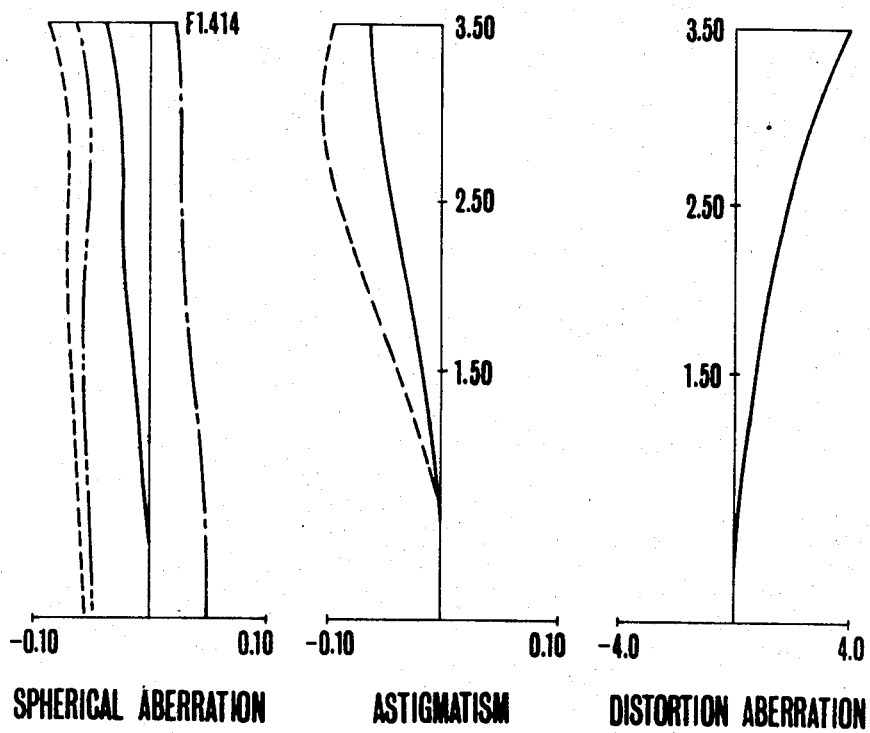

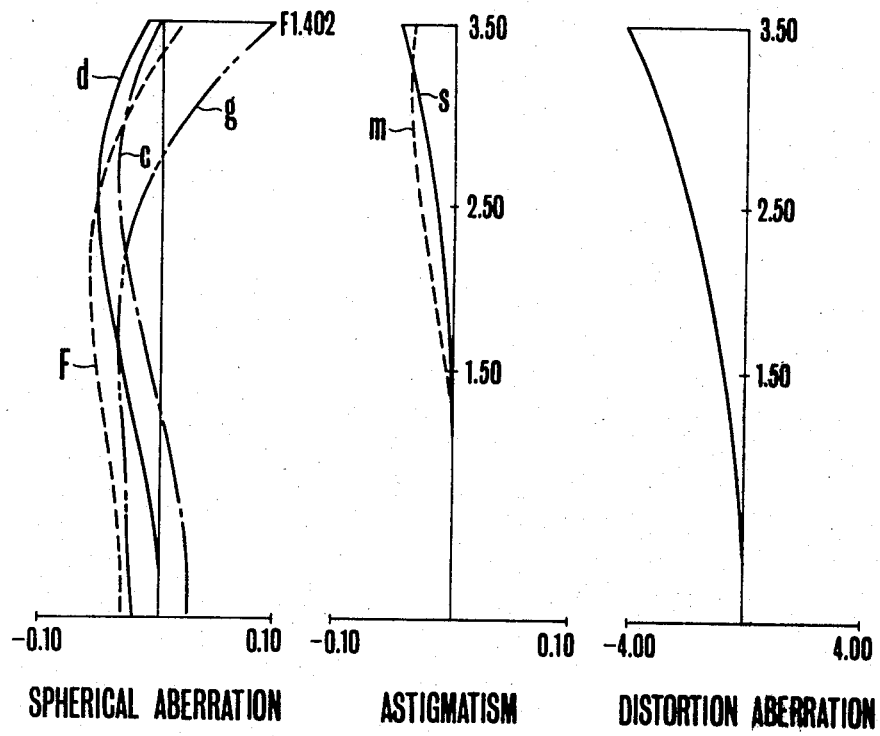

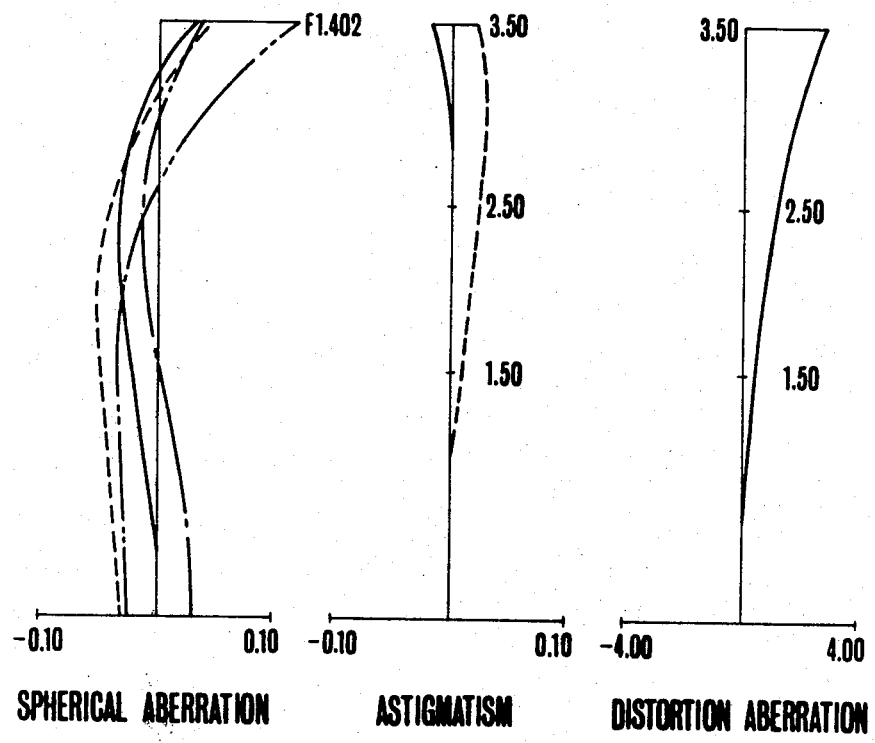

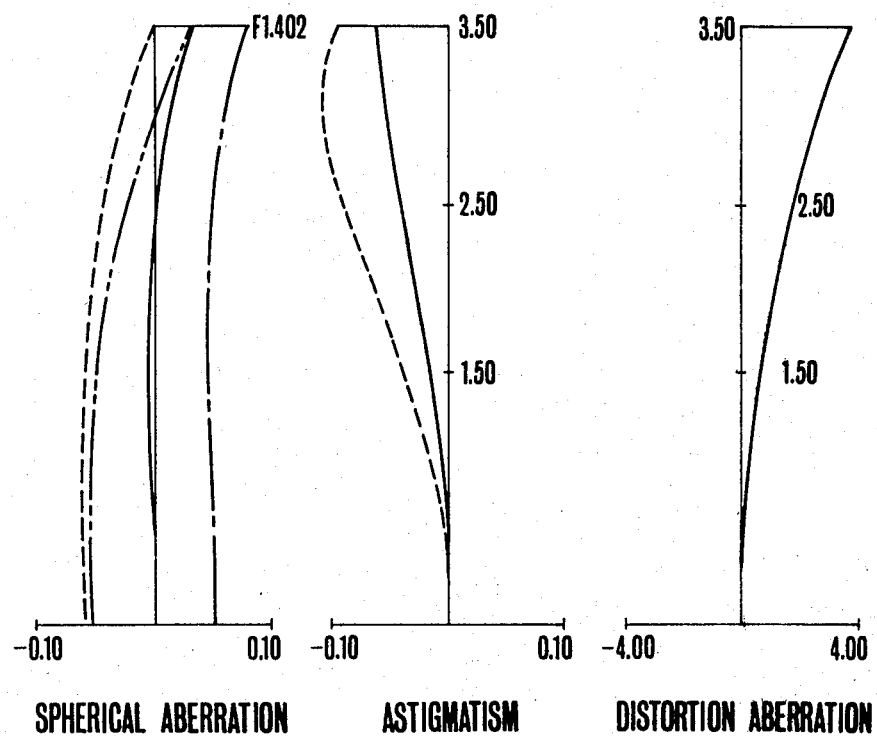

COMPACT ZOOM LENS

BACKGROUND OF THE INVENTION

This invention relates to a zoom lens having a zooming ratio of about 5 with a large relative aperture and of compact structure especially well suited for relatively small cine-cameras.

It is known in the art to achieve an increase in the relative aperture up to 1 : 1.4 or greater with zoom objectives having a zooming range of 1 : 4. In addition thereto, the present invention has made it possible with a zoom objective of such characteristics and having a relatively wide angular field of 44° to minimize the diameter of the fully open entrance pupil so that a remarkable shortening in the size of the camera can be achieved across the optical axis of the objective, while preserving good correction of various image aberrations throughout the entire zooming range.

As cine-cameras are generally equipped with view finders of the same type as that employed in single lens reflex cameras, most of the zoom objectives adapted for use therewith are constructed to have an afocal zoom control set of lens groups arranged to be movable along a common optical axis of the other lens groups. In this case, the diameter (P) of the fully open entrance pupil of the entire objective may be determined by the formula : $P = FR/F$, wherein Fr is the equivalent focal length of a relay lens situated in the rear of the afocal zoom control lens set and F is the aperture number of the largest aperture of the objective (for example 1.4). When a value is given for the aperture number F, the entrance pupil diameter P can be decreased by decreasing the focal length Fr. Such a decrease of the focal length Fr, however, in turn, calls for an increase of the diameter of the front lens member of the objective as can be seen by tracing the inclinations of the light ray bundle from the image format in the reverse direction to that in which the light ray bundle enters through the objective. In this manner, the light ray bundle is made susceptible of relatively larger inclinations at the afocal region. If this is avoided by employing a means of increasing the focal length Fr of the relay lens with increase in the focal length of the entire objective, a decreased angular field will result. Assuming alternatively that the focal length of the entire objective is given and therefore the focal length Fr is given, when the diameter P is decreased, the aperture number F increases to such an extent that it is impossible to provide a high relative aperture for the objective.

SUMMARY OF THE INVENTION

It is, accordingly, the general object of the present invention to provide a zoom objective of the type described which will avoid the above-mentioned contradictions and which is provided with decreased diameters of the front member and fully open entrance pupil as compared to known objectives of the same type as the present invention with respect to the zooming ratio, relative aperture and angular field while maintaining good stability of aberration correction throughout the entire zooming range. Such improvements can be effected by fulfilling the following general requirements for the design parameters in connection with a preferred embodiment of a zoom objective of the invention. The zoom objective consists of four lens groups optically aligned on a common axis. The first group, counting from the front, is composed of a negative lens element and a positive lens element cemented together at their adjoining surfaces and, further, of a positive singlet lens element, arranged in this order from the front, to have a positive refractive power and to be axially movable for focusing control and stationary during zooming. The second group is composed of a singlet lens element which, in the two specific examples to be described later, has a negative refractive power, and a negative doublet component of a negative lens element and a positive lens element cemented together at their adjoining surfaces in this order from the front, and is arranged to be axially movable during zooming to vary the equivalent focal length of the objective throughout a range. The third group has a positive refractive power and is composed of a negative singlet lens element and a positive single lens element airspaced apart from each other in this order from the front, and is arranged to be axially movable along a path convex to the rear as the second group performs a total axial movement from one end to the other of the range of variation of the equivalent focal length of the objective. In this manner, the size of the image can be varied while maintaining constant the position of the image plane.

The construction and arrangement of these first, second and third lens groups constitute a substantially afocal system situated in front of a fourth group having a positive refractive power and which serves to focus the image at a shorter distance from the front vertex that that at which the image would be otherwise focused by the afocal system alone. The construction of the fourth lens group according to a preferred embodiment of the invention to be described later comprises five singlets having positive, negative, positive and positive refractive powers in this order from the front.

The afocal lens system has parameters determined within ranges as specified below to provide improved stabilization of aberrations throughout the zooming range:

1. $Fw < / F_{II} / < 1.4Fw; F_{II} < 0$
2. $0.75F_I < R_2 < 0.95F_I$
3. $0.6F_I < R_4 < 0.8F_I$
4. $-10F_{II} < R_6 < \infty$ ($\infty$ indicates a plane)
5. $0.3F_{III} < R_{12} < 0.5F_{III}$
6. $R_{12} < R_{13} < 1.2R_{12}$
7. $n_{14} < n_{12}$
8. $V_{12} < V_{14}$ wherein Fw is the minimum equivalent focal length of the entire objective; $F_I$ is the equivalent focal length of the first lens group; $F_{II}$ is the equivalent focal length of the second lens group; $F_{III}$ is the equivalent focal length of the third lens group; $R_2$ is the radius of curvature of the cemented surface in the first group; $R_4$ is the radius of curvature of the front surface of the rear positive meniscus singlet of the first group; $R_6$ is the radius of curvature of the front surface of the negative meniscus singlet of the second group; $R_{12}$ is the radius of curvature of the rear surface of the negative singlet of the third group; $R_{13}$ is the radius of curvature of the front surface of the positive singlet of the third group; $n_{12}$ and $V_{12}$ are the refractive index and Abbe's number of the material of the negative singlet of the third group; and $n_{14}$ and $V_{14}$ are the refractive index and Abbe number of the positive singlet of the third group.

It is to be noted that the cemented contact of each of the doublets in the above objective may be converted to what is commonly known as a "blocken contact."

BRIEF DESCRIPTION OF THE DRAWINGS

FIGS. 3A, 3B and 3C are various aberration curves of the objective of FIG. 1 at the wide angle setting.

FIGS. 4A, 4B and 4C are various aberration curves of the objective of FIG. 1 at an intermediate setting.

FIGS. 5A, 5B and 5C are various aberration curves of the objective of FIG. 1 at the telephoto setting.

FIGS. 6A, 6B and 6C are various aberration curves of the objective of FIG. 2 at the wide angle setting.

FIGS. 7A, 7B and 7C are various aberration curves of the objective of FIG. 2 at an intermediate setting.

FIGS. 8A, 8B and 8C are various aberration curves of the objective of FIG. 2 at the telephoto setting.

DESCRIPTION OF THE PREFERRED EMBODIMENT

Figure 1:
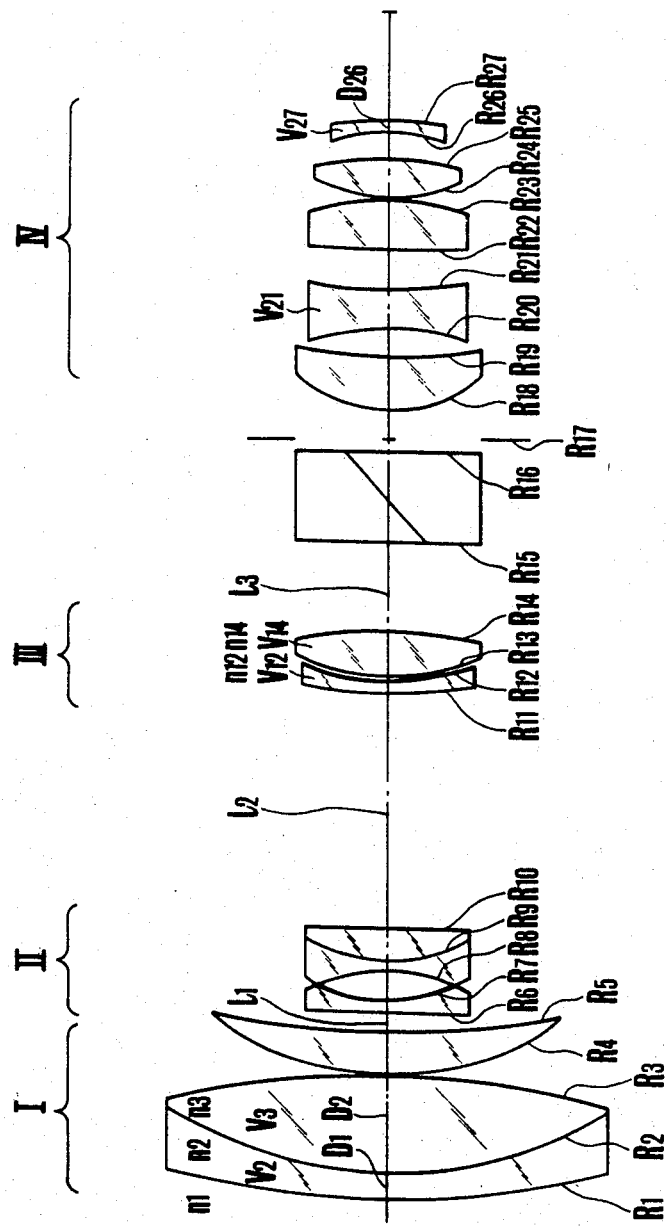
FIGS. 1 and 2 are lens block diagrams of two examples of a preferred embodiment of the zoom objective according to the invention.
Figure 2:
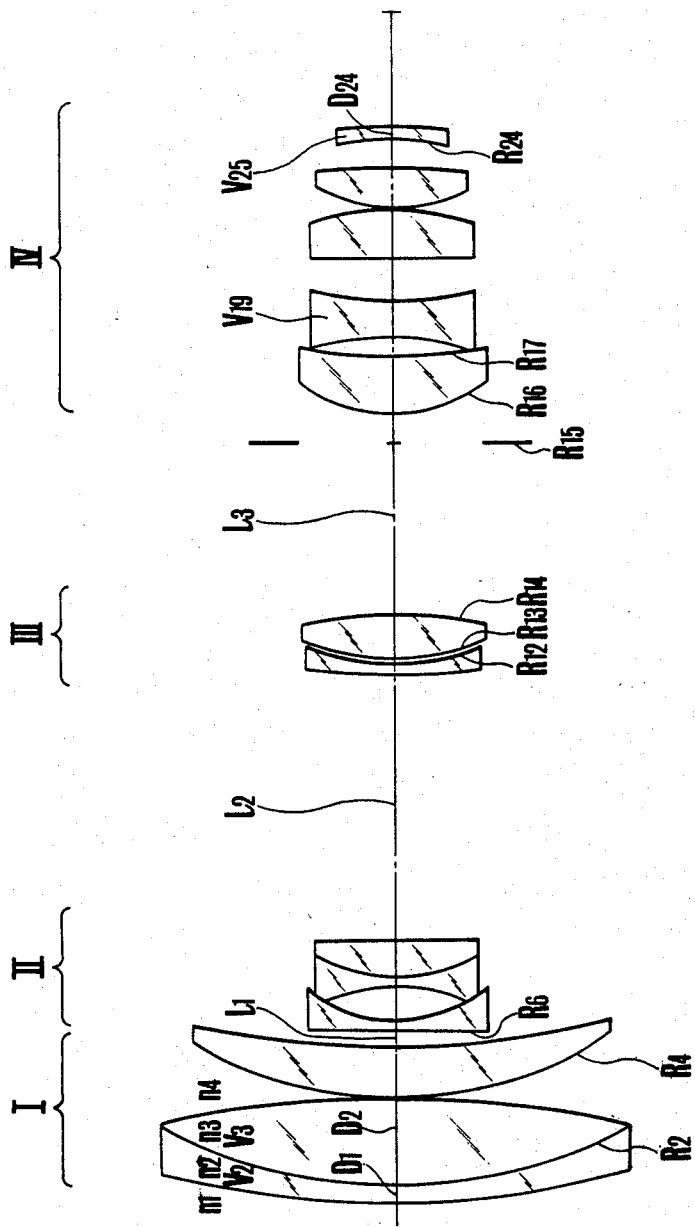

In FIGS. 1 and 2, there are shown two examples of a preferred embodiment of the zoom objective constructed in accordance with the numerical data given in Tables 1 and 2 to be described later respectively, each of which is shown as comprising first, second, third and fourth lens groups designated I, II, III and IV respectively and as having a diaphragm located in front of the fourth group IV. While those of the parameters in Tables 1 and 2 which are assigned to the first, second and third groups I, II and III are specified to effect a high-standard stabilization of aberrational correction throughout the zooming range based on the above-mentioned relationships (1) through (8), the other parameters assigned to the fourth lens group are specified based on the following relationships set forth for the excellent state of correction of the image aberrations.

FOR TABLE 1 a. $0.6 F_{IV} < R_{18} < 0.7 F_{IV}$
b. $1.0 F_{IV} < /R_{20}/ < 1.25 F_{IV}$ ; $R_{20} < O$
c. $1.5 F_{IV} < R_{21} < 1.8 F_{IV}$
d. $0.65 F_{IV} < /R_{26}/ < 0.8 F_{IV}$ ; $R_{26} < O$
e. $25 < V_{21} < 30$
f. $25 < V_{27} < 30$ wherein $F_{IV}$ is the equivalent focal length of the fourth lens group; $R_{18}$ is the radius of curvature of the front surface of the frontmost singlet of the fourth group, $R_{20}$ and $R_{21}$ are the radii of curvature of the front and rear surfaces of the second singlet respectively; $R_{26}$ is the radius of curvature of the front surface of the rearmost singlet; and $V_{21}$ and $V_{27}$ are the Abbe numbers of the materials of the front and rear negative singlets respectively.

FOR TABLE 2

In the above-mentioned relationships (a) through (f), the $R_{18}$ should be replaced by $R_{16}$, the $R_{20}$ by $R_{18}$, the $R_{21}$ by $R_{19}$, the $R_{26}$ by $R_{24}$, the $V_{21}$ by $V_{19}$, and the $V_{27}$ by $V_{25}$.

Consideration will next be given to the meanings of the relationships set forth above. Condition (1) is a compromise between the requirements of the intended degree of compactness of the entire objective and of good performance in operation with the zoom ratio of about 5 and with the relative aperture of 1 : 1.4. As the equivalent focal length of the second lens group II is decreased from the lower limit thereof, the increased degree of compactness of the entire objective can be achieved, but the variation of residual aberrations with zooming is caused to increase with the result of providing an objective having a decreased zoom ratio or having a decreased relative aperture. Condition 2 is a compromise between the requirements of avoiding the undercorrection of spherical and chromatic aberrations and of avoiding the overcorrection thereof which are encountered at the telephoto settings when the upper and lower limits are violated respectively. Condition 3 is for good stabilization of astigmatism during zooming. When the upper limit is violated, the astigmatism is varied to a large extent, while when the lower limit is violated, the curvature is increased to introduce manufacturing difficulties. Condition 4 is for good stabilization of distortion and coma at the same time during zooming. When the upper limit is violated, the variation of distortion is intensified, while when the lower limit is violated, the variation of coma becomes unacceptable. Conditions 5, 6 and 7 are for minimization of variation of coma at intermediate points in the zooming range. When the upper limit of condition 5 and the lower limit of condition 6 are violated and condition 7 is not satisfied, the inward coma becomes so serious that it is impossible to provide an objective having as great a relative aperture as 1 : 1.4. Conversely, when the lower limit of condition 5 and the upper limit of condition 6 are violated, the outward coma becomes negligible. Condition 8 is for correction of chromatic aberrations within the third lens group III which serves to minimize the variation of chromatic aberrations at intermediate points in the zooming range.

Condition $a$ provides an action between over- and under-corrections for astigmatism which are resulted when the upper and lower limits are violated respectively. Condition $b$ provides an action between under- and over-corrections mainly for spherical aberration which are resulted when the upper and lower limits are violated respectively. Condition $c$ provides an action between under- and over-corrections for astigmatism which are resulted when the upper and lower limits are violated respectively. Condition $d$ provides an action between under- and over-correction mainly for spherical aberration which are resulted when the upper and lower limits are violated respectively. Condition $e$ provides an action for compensating axial chromatic aberration which results in over-correction when the upper limit is violated. When the lower limit is violated, the lower limit of condition $e$ indicates the minimum of the values of Abbe numbers of commercially available optical glasses. Condition $f$ provides an action for compensating mainly the lateral chromatic aberration which results in under-correction when the upper limit is violated. The lower limit of condition $f$ indicates the same meaning as that of condition $e$.

According to the preferred embodiment of the present invention, the examples 1 and 2 of the compact zoom objective can be constructed as represented by the numerical values in Tables 1 and 2 respectively for the radii of curvature, R, the axial thicknesses and the axial separation between lenses, D, along with the indices, nd, of refraction for the spectral D line of sodium and the Abbe numbers, Vd, of the various lens elements. The numbers which are listed in the first column and which are also used in the FIGS. 1 and 2 as subscripts to identify the particular surface lens thickness, axial separation, refractive index and Abbe number referred to are counted from the front to the rear. The plus and minus values of the radii, R, indicate surfaces respectively convex and concave toward the front. In example 1, numbers 16 and 17 are assigned to the front and rear flat surfaces of a beam-splitter constituting part of a view finder of the camera, and a number 17 is assigned to a diaphragm. In example 2, a number 15 is assigned to a diaphragm.

Table 1

| Zooming range f = 9.24822–43.95121 f-number 1 : 1.414 | | | |
|---|---|---|---|
| R | D | nd | Vd |
| 1  84.146 | 2.00 | 1. | |
| 2  35.583 | 7.87 | 1.8051 | 25.4 |
| 3  −103.996 | 0.10 | 1.5891 | 61.1 |
| 4  27.917 | 4.07 | 1. | |
| 5  95.165 | 11 | 1.5891 | 61.1 |
| 6  363.049 | 0.90 | 1. | |
| 7  12.195 | 2.61 | 1.6935 | 53.3 |
| 8  −16.671 | 0.90 | 1. | |
| 9  13.785 | 2.79 | 1.6935 | 53.3 |
| 10  −7680.848 | 12 | 1.8051 | 25.4 |
| 11  39.088 | 0.90 | 1. | |
| 12  17.070 | 0.54 | 1.6476 | 33.8 |
| 13  18.367 | 3.78 | 1. | |
| 14  −30.864 | 13 | 1.5163 | 64.1 |
| 15  ∞ | 7.50 | 1. | |
| 16  ∞ | 1.14 | 1.5163 | 64.1 |
| 17 | 2.50 | 1. | |
| 18  13.405 | 4.64 | 1. | |
| 19  75.664 | 2.24 | 1.6667 | 48.3 |
| 20  −22.095 | 3.00 | 1. | |
| 21  33.763 | 3.41 | 1.8051 | 25.4 |
| 22  125.654 | 4.20 | 1. | |
| 23  −20.054 | 0.30 | 1.6667 | 48.3 |
| 24  15.048 | 2.99 | 1. | |
| 25  −35.230 | 2.26 | 1.6584 | 50.9 |
| 26  −14.829 | 0.80 | 1. | |
| 27  −78.150 | 9.48 | 1.8051 | 25.4 |

| Lens separations during zooming with object at infinity | | | |
|---|---|---|---|
| F | $l_1$ | $l_2$ | $l_3$ |
| 9.248 | 1.495 | 19.951 | 7.298 |
| 20.161 | 14.229 | 14.106 | 0.400 |
| 43.951 | 20.085 | 1.362 | 7.298 |

| Lens group | I | II | III | IV |
|---|---|---|---|---|
| Equivalent focal length | 41.64 | −10.80 | 42.34 | 20.50 |

Table 2

| Zooming range f = 9.25370–43.97726 F-number 1 : 1.402 | | | |
|---|---|---|---|
| R | D | nd | Vd |
| 1  95.272 | 1.40 | 1. | |
| 2  39.047 | 7.32 | 1.8051 | 25.4 |
| 3  −114.420 | 0.15 | 1.5891 | 61.1 |
| 4  30.544 | 4.58 | 1. | |
| 5  106.731 | 1.18 | 1.5891 | 61.1 |
| 6  149.915 | 0.90 | 1. | |
| 7  12.095 | 2.86 | 1.5891 | 61.1 |
| 8  −17.698 | 0.90 | 1. | |
| 9  14.436 | 2.87 | 1.6935 | 53.3 |
| 10  288.052 | 22.27 | 1.8051 | 25.4 |
| 11  52.498 | 1.00 | 1. | |
| 12  18.896 | 0.47 | 1.6476 | 33.8 |
| 13  20.251 | 3.61 | 1. | |
| 14  −32.430 | 14.16 | 1.5399 | 59.5 |
| 15 | 2.50 | 1. | |
| 16  13.138 | 4.48 | 1. | |
| 17  69.879 | 1.65 | 1.6667 | 48.3 |
| 18  −23.211 | 3.32 | 1. | |
| 19  33.985 | 3.45 | 1.8051 | 25.4 |
| 20  140.905 | 4.27 | 1. | |
| 21  −19.893 | 0.10 | 1.6667 | 48.3 |
| 22  15.330 | 3.43 | 1. | |
| 23  −37.716 | 2.32 | 1.6584 | 50.9 |
| 24  −14.728 | 0.80 | 1. | |
| 25  −88.491 | | 1.8051 | 25.4 |
|  |  | 1. |  |

| Lens separations during zooming with object at infinity | | | |
|---|---|---|---|
| F | $l_1$ | $l_2$ | $l_3$ |
| 9.253 | 1.187 | 22.277 | 14.164 |
| 20.173 | 15.347 | 15.782 | 6.500 |
| 43.977 | 20.655 | 1.622 | 14.164 |

| Lens group | I | II | III | IV |
|---|---|---|---|---|
| Equivalent focal length | 45.66 | −12.00 | 46.40 | 20.50 |

What is claimed is:

1. A compact zoom lens comprising : four lens groups optically aligned on a common axis, a first group (counting from the front) axially movable to effect focusing which remains stationary during zooming, said first group having a positive refractive power and being composed of a positive compound component and a positive simple component rearwardly spaced therefrom, said positive compound component being constituted by negative and positive lens elements in this order from the front, a second group having a negative refractive power axially movable behind said first group to effect variation of the equivalent focal length of the entire lens system, a third group having a positive refractive power axially movable behind said second group to effect compensation of the image plane, said third group being composed of a negative component and a positive component spaced from each other in this order from the front, and a fourth group having a positive refractive power which serves as an image-forming lens, said zoom lens being characterized by the following relationships:

1. $Fw < / F_{II} / < 1.4Fw$ ; $F_{II} < 0$
2. $0.75F_I < R_2 < 0.95F_I$
3. $0.6F_I < R_4 < 0.8F_I$
4. $-10F_{II} < R_6 < \infty$
5. $0.3F_{III} < R_{12} < 0.5F_{III}$
6. $R_{12} < R_{13} < 1.2R_{12}$
7. $n_{14} < n_{12}$
8. $V_{12} < V_{14}$ wherein Fw is the minimum equivalent focal length of the entire lens system; $F_I$, $F_{II}$ and $F_{III}$ are the equivalent focal lengths of the first, second and third lens groups respectively; $R_2$ is the radius of curvature of the internal contacting surface in the first group; $R_4$ is the radius of curvature of the front surface of the rear component of the first group; $R_6$ is the radius of curvature of the front surface of the second group; $R_{12}$ is the radius of curvature of the rear surface of the negative component of the third group; $R_{13}$ is the radius of curvature of the front surface of the positive component of the third group; $n_{12}$ and $V_{12}$ are respectively the refractive index and Abbe number of the material from which the negative component of the third group is made, and $n_{14}$ and $V_{14}$ are respectively the refractive index and Abbe number of the material from which the positive component of the third group is made.

2. A compact zoom lens as described in claim 1, wherein said fourth lens group is composed from front to rear of a positive lens element with the front surface convex to the front, a bi-concave lens element, two positive lens elements and a negative lens element with the front surface concave to the front, being characterized by the following relationships:
 a. $0.6F_{IV} < R_{18} < 0.7F_{IV}$
 b. $1.0F_{IV} < / R_{20} / < 1.25F_{IV}$
 c. $1.5F_{IV} < R_{21} < 1.8F_{IV}$
 d. $0.65F_{IV} < / R_{26} / < 0.8F_{IV}$ e. $25 < V_{21} < 30$ f. $25 < V_{27} < 30$ wherein $F_{IV}$ is the equivalent focal length of the fourth lens group; $R_{18}$ is the radius of curvature of the front surface of the frontmost positive lens element in the fourth group; $R_{20}$ and $R_{21}$ are respectively the radii of curvature of the front and rear surfaces of the second bi-concave lens element in the fourth lens group; $R_{26}$ is the radius of curvature of the front surface of the rearmost lens element in the fourth group; and $V_{21}$ and $V_{27}$ are the Abbe numbers of the materials of the front and rear negative lens elements in the fourth group respectively.

3. A compact zoom lens as described in claim 1, wherein said third lens group is composed from front to rear of a negative meniscus lens element with the rear surface concave to the rear and a bi-convex lens element.

4. A compact zoom lens comprising: four lens groups, a first group counting from the front for focusing control having a positive refractive power, a second group for variation control having a negative refractive power; a third group for compensation control having a positive refractive power; and a fourth lens group for image formation having a positive refractive power, said first group being composed from front to rear of a negative meniscus lens element and a bi-convex lens element cemented together at their adjoining surfaces to make a positive doublet and a positive meniscus lens element rearwardly spaced from said doublet, said third group being composed of a negative meniscus lens element with the rear surface concave to the rear and a bi-convex lens element rearwardly air-spaced from said negative meniscus lens element, and said fourth group being composed from front to rear of a positive meniscus lens element with the front surface convex to the front, a bi-concave lens element, two bi-convex lens elements and a negative meniscus lens element with the front surface concave to the front.

5. A compact zoom lens as described in claim 4, wherein said second group is composed from front to rear of a negative meniscus lens element and a negative lens doublet of a bi-concave lens element and a positive lens element cemented together at their adjoining surfaces.

6. A compact zoom lens comprising: a first lens group, counting from the front for focusing control, having a positive refractive power, said first lens group being composed from front to rear of a positive cemented component of negative and positive lens elements and a positive lens element rearwardly spaced therefrom, a second lens group for variation control having a negative refractive power, a third lens group for compensation control having a positive refractive power, said third lens group being composed from front to rear of a negative lens element and a positive lens element air-spaced from each other, and a fourth lens group for image formation having a positive refractive power, wherein the equivalent focal length ($F_{II}$) of said second group is larger than the minimum equivalent focal length (Fw) of the entire lens system and smaller than 1.4 times the minimum equivalent focal length of the entire lens system, the radius ($R_2$) of curvature of the cemented surface of said first group is larger than 0.75 times and smaller than 0.95 times the equivalent focal length ($F_I$) of said first group; the radius ($R_4$) of curvature of the front surface of said rear positive lens element of said first group is larger than 0.6 times and smaller than 0.8 times the equivalent focal length ($F_I$) of said first group; the radius ($R_6$) of curvature of the frontmost surface of said second group is convex to the front and is larger than 10 times the equivalent focal length ($F_{II}$) of said second group; the radius ($R_{12}$) of curvature of the rear surface of said negative lens element of said third group is larger than 0.3 times and smaller than 0.5 times the equivalent focal length ($F_{III}$) of said third group; the radius ($R_{13}$) of curvature of the front surface of said positive lens element of said third group is larger than 1 time and smaller than 1.2 times the radius ($R_{12}$) of curvature of the rear surface of said negative lens element of said third group; the index ($n_{14}$) of refraction of a material from which said positive lens element of said third group is made is smaller than the index ($n_{12}$) of refraction of a material from which said negative lens element of said third group is made; and the Abbe number ($V_{12}$) of the material of said negative lens element of said third group is smaller than the Abbe number ($V_{14}$) of the material of said positive lens element of said third group.

7. A compact zoom lens as described in claim 6, wherein said fourth lens group is composed from front to rear of a positive lens element with the front surface convex to the front, a bi-concave lens element, two positive lens elements and a negative lens element with the front surface concave to the front, and wherein the radius ($R_{18}$) of curvature of the front surface of said frontmost positive lens element in said fourth group is larger than 0.6 times and smaller than 0.7 times the equivalent focal length ($F_{IV}$) of said fourth group; the radius ($R_{20}$) of curvature of the front surface of said bi-concave lens element in said fourth group is larger than 1.0 times and smaller than 1.25 times the equivalent focal length ($F_{IV}$) of said fourth group; the radius ($R_{21}$) of curvature of the rear surface of said bi-concave lens element in said fourth group is larger than 1.5 times and smaller than 1.8 times the equivalent focal length ($F_{IV}$) of said fourth group; the radius ($R_{26}$) of curvature of the front surface of said negative lens element in said fourth group is larger than 0.65 times and smaller than 0.8 times the equivalent focal length ($F_{IV}$) of said fourth group; and both of the Abbe numbers ($V_{21}$) and ($V_{27}$) of materials from which said bi-concave and negative lens elements of said fourth group are made are larger than 25 and smaller than 30.

* * * * *